US008738546B2

(12) United States Patent
Basak et al.

(10) Patent No.: US 8,738,546 B2
(45) Date of Patent: May 27, 2014

(54) SELF-ORGANIZING ENERGY PRICING

(75) Inventors: Jayanta Basak, New Delhi (IN); Devasenapathi P. Seetharamakrish, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 12/615,346

(22) Filed: Nov. 10, 2009

(65) Prior Publication Data

US 2011/0112987 A1 May 12, 2011

(51) Int. Cl.
*G06F 17/00* (2006.01)

(52) U.S. Cl.
USPC .......... 705/412

(58) Field of Classification Search
USPC ......... 705/400, 412, 37, 1.1, 7.11, 7.12, 7.22, 705/7.23, 7.24, 7.25, 7.29, 7.31, 7.33, 7.34, 705/7.35, 26.1, 26.2, 26.25, 26.3, 28, 29, 705/30, 348; 700/286, 291, 293, 295, 297, 700/296, 299
See application file for complete search history.

(56) References Cited

U.S. PATENT DOCUMENTS

| | | | | |
|---|---|---|---|---|
| 4,317,049 | A | 2/1982 | Schweppe | |
| 4,385,241 | A | 5/1983 | Peddie et al. | |
| 6,314,378 | B1 | 11/2001 | Hodge et al. | |
| 6,772,052 | B1 | 8/2004 | Amundsen et al. | |
| 7,231,281 | B2 | 6/2007 | Costa | |
| 7,242,114 | B1 | 7/2007 | Cannon et al. | |
| 7,356,385 | B2 | 4/2008 | Lenarduzzi et al. | |
| 7,373,222 | B1 | 5/2008 | Wright et al. | |
| 7,583,202 | B2 * | 9/2009 | Robinson et al. | 340/870.02 |
| 2002/0091626 | A1 * | 7/2002 | Johnson et al. | 705/37 |
| 2003/0061143 | A1 | 3/2003 | Gustafson | |
| 2005/0240427 | A1 * | 10/2005 | Crichlow | 705/1 |
| 2007/0177319 | A1 * | 8/2007 | Hirst | 361/85 |
| 2008/0040223 | A1 * | 2/2008 | Bridges et al. | 705/14 |
| 2009/0012916 | A1 * | 1/2009 | Barnett | 705/412 |

OTHER PUBLICATIONS

Pedregal et al. Electricity Prices Forecasting by Automatic Dynamic Harmonic Regression Models, Dec. 2006.
Berger et al. Real-time Pricing to Assist in Load Frequency Control, Aug. 1989.
Availability-based Tariff: http://en.wikipedia.org/wiki/Availability_based_tariff, Jan. 2000.
LeMay et al. An Integrated Architecture for Demand Response Communications and Control, 2008.
Automatedbuildings.com interview: http://www.automatedbuildings.com/news/jul06/interviews/060630061303hammerstrom.htm.

(Continued)

*Primary Examiner* — Igor Borissov
(74) *Attorney, Agent, or Firm* — Ryan, Mason & Lewis, LLP

(57) ABSTRACT

Techniques for real-time pricing of electrical energy are provided. The techniques include receiving electrical energy data, wherein the electrical energy data comprises one or more energy pricing parameters specified by an energy supplier, measuring power grid frequency, wherein the power grid comprises the current frequency of the power grid, measuring current energy consumption, wherein current energy consumption comprises total energy consumption in a sampling period, retrieving consumption history, wherein consumption history comprises energy consumed by a customer over a time period, computing a unit energy rate as a function of customer type, the one or more pricing parameters, frequency and past history of consumption, and using the computed rate to compute a total charge as a product of the unit energy rate and the total energy consumption.

20 Claims, 4 Drawing Sheets

(56) References Cited

OTHER PUBLICATIONS

Du Bois, Time of Use Electricity Billing: How Puget Sound Energy Reduced Peak Power Demands (Case Study), http://energypriorities.com/entries/2006/02/pse_tou_amr_case.php.

Fehrenbacher. Why the Smart Grid Won't Have the Innovations of the Internet Any Time Soon. http://earth2tech.com/2009/06/05/why-the-smart-grid-wont-have-the-innovations-of-the-internet-any-time-soon/.

Borenstein et al. Dynamic Pricing, Advanced Metering, and Demand Response in Electricity Markets. (Oct. 31, 2002). Center for the Study of Energy Markets.

White, Sara. Development of Distributed Intelligent Load Controller, Jul. 2005.

Prasad et al. Role of Availability-based Tariff and Its Reliability in the Distribution of Generated Power Under Emerging Electric Power Systems, from Proceeding (526) Energy and Power Systems—2006.

Pacific Northwest National Laboratory Grid Friendly Appliance Controller Demonstration Project, 2006.

Dynamic Demand. Current work on demand control. http://www.dynamicdemand.co.uk/current_work.htm, accessed May 13, 2010.

National Grid Company (NGC), Frequency Control by Demand Management (FCDM), accessed May 13, 2010.

* cited by examiner

SELF-ORGANIZING ENERGY PRICING

FIELD OF THE INVENTION

Embodiments of the invention generally relate to information technology, and, more particularly, to pricing systems.

BACKGROUND OF THE INVENTION

The demand for electrical energy is not constant, as there are certain hours of each day when demand peaks at levels considerably higher than the remainder of the day. If utility companies buy energy during the peak demand periods, they have to pay a premium for transferring energy when the transmission lines are congested. Flat-rate electric tariffs shield most customers from fluctuations in energy costs, especially those caused by buying energy supplies on short notice. Utilities, however, are not insulated from these fluctuations.

When the market rate for electricity rises above the approved retail rate, utilities are caught in the middle, which can be financially disastrous. Utilities cannot simply pass price increases along to customers without regulatory approval. As such, utility companies, to protect themselves from widely fluctuating costs and to reduce peak demands, have started introducing various time-based pricing mechanisms. Existing mechanisms include time of use (TOU), critical peak pricing (CPP), real-time pricing (RTP) and peak load reduction credits (PLRC). None of the existing approaches, however, support a dynamic pricing scheme for end customers or support variable pricing curves based on customer profile.

By way of example, in TOU pricing systems supported by smart meters, there can be both a significant delay before information reaches consumers and significant gaps in energy data details. These delays and gaps can undercut the premise of how smart meter technologies will empower consumers to make decisions about their energy use based on real-time costs. Also, the current RTP schemes require the meters (at customer premises) to connect to the utility systems to obtain the current price. Such a centralized approach is inefficient, as it requires huge communication and computation resources.

SUMMARY OF THE INVENTION

Principles and embodiments of the invention provide techniques for self-organizing energy pricing. An exemplary method (which may be computer-implemented) for real-time pricing of electrical energy, according to one aspect of the invention, can include steps of receiving electrical energy data, wherein the electrical energy data comprises one or more energy pricing parameters specified by an energy supplier, measuring power grid frequency, wherein the power grid comprises the current frequency of the power grid, measuring current energy consumption, wherein current energy consumption comprises total energy consumption in a sampling period, retrieving consumption history, wherein consumption history comprises energy consumed by a customer over a time period, computing a unit energy rate as a function of customer type, the one or more pricing parameters, frequency and past history of consumption, and using the computed rate to compute a total charge as a product of the unit energy rate and the total energy consumption.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
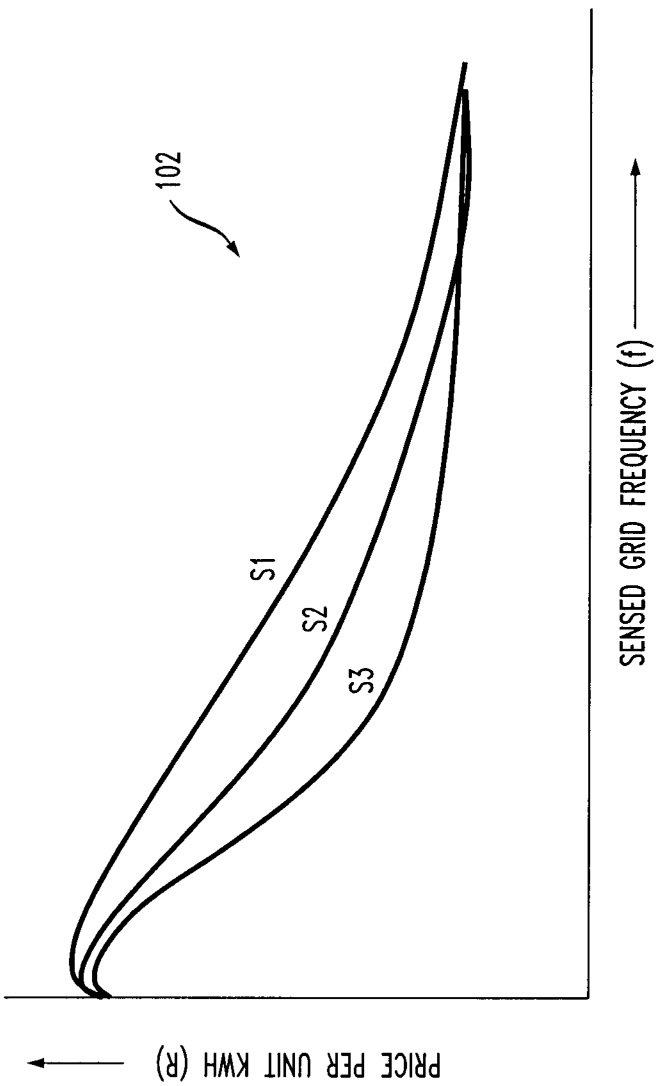
FIG. 1 is a diagram illustrating differential pricing to different segments, according to an embodiment of the present invention.

Principles of the invention include self-organizing energy pricing. In existing approaches, the peak load of all customers coincide to create huge load peaks. One or more embodiments of the invention include reducing the peak load by distributing the peak loads of individual customers across the day. In a typical price sensitivity curve, as the price increases, probability of usage reduces. As such, price sensitivity for electric energy is in between fully elastic (such as, for example, drinking water) and fully inelastic (such as, for example, fast food).

One or more embodiments of the invention include a real time pricing system that includes the following properties. Such a system recomputes the energy price within a few minutes of a change in load. The system works in a decentralized fashion to minimize the computation and communication resource requirements and to avoid any single point of failure. Additionally, such a system can implement a stratified pricing system to satisfy the needs of different types of customers. For example, the pricing structure of a hospital could be different from an industrial customer. Further, in one or more embodiments of the invention, the system can reduce peak loads by increasing prices during peak hours and thereby discouraging consumption.

The techniques described herein include a decentralized real-time pricing scheme that functions in a self-organized manner. One or more embodiments of the invention can include locating the frequency sensing meter in a customer's premises, which can compute consumption charges in real-time based on overall electrical load. Many existing approaches do not address a frequency sensing metering scheme. Additionally, in one or more embodiments of the invention, the load is not switched on or off. Rather, the user can be sensitized about the current energy price (for example, the price can be dependent on the current grid conditions and past consumption history of the consumer).

Some existing approaches disadvantageously put a heavy communication burden on exchange servers. One or more embodiments of the invention, in contrast, include a decentralized pricing mechanism where individual meters determine the current price based on the parameters that are obtained from the exchange server. These parameters can be downloaded at an update frequency set by the utility (for example, once a month). This not only reduces communication costs but also is resilient to any single point of failure. That is, if the utility server fails, the meters in the field can continue to function with old pricing parameters and get the latest parameters when the server is restored.

The frequency of a power grid is inversely proportional to the load on that grid. In one or more embodiments of the invention, by sensing the frequency (which can be accomplished, for example, using a simple circuit), the current demand can be determined and the energy price can be computed accordingly. The base energy price can be set by a central server, and this base price can be computed as a function of the customer type, location (under-developed versus cities), etc.

One or more embodiments of the invention include a system that includes two types of components: frequency sensing meters (FSMs) and utility servers. FSMs can be installed at customer premises and can be responsible for computing the consumption charges as well as transmitting the values to a utility server. Utility servers can compute the base price for different types of customers and send the base price to a FSM as instructed or as necessary (for example, once per week, once per month, etc.). Additionally, in one or more embodiments of the invention, the utility servers can send revised prices asynchronously to FSMs.

FIG. 1 is a diagram illustrating differential pricing to different segments, according to an embodiment of the present invention. By way of illustration, FIG. 1 depicts a graph 102 illustration exemplary curves S1, S2 and S3 on a y-axis representing price per unit kilowatt hour (KWH) (R) and an x-axis representing sensed grid frequency (f). As illustrated in FIG. 1, S1 represents a customer segment 1, S2 represents a customer segment 2 and S3 represents a customer segment 3. Additionally, h would represents consumption history remaining the same across segments, but history "h" need not be included in the depicted graph because curves S1, S2 and S3 simply illustrate how the price is inversely proportional to the grid frequency (and history is not a factor in this relationship).

In one or more embodiments of the invention, the FSM will measure the frequency of the grid once every sampling period (for example, every fifteen minutes, one hour, etc.). The FSM uses the sensed frequency to map it to the base price on a Frequency versus KWH-rate curve sent by the utility server. As described herein, this curve can be different for different customer segments. The unit rate is computed as a function (not necessarily linear) of sensed frequency, consumption history and the base price given for the customer profile.

Additionally, in one or more embodiments of the invention, per unit (KWH) price (R) is inversely proportional to sensed frequency (f). As the load increases, grid frequency (f) decreases and the rate increases. Conversely, as the load decreases, grid frequency increases and the rate decreases. In other words, the energy rate reflects the current demand for energy. Meters measure the grid frequency to determine the current demand level. Also, per unit (KWH) price (R) is directly proportional to history (h). History (h)=Cumulative value of consumption over a time period (sliding window). Consumption, by way of example, can be described in terms of KWH.

For example, consider a weekly history h of 100 KWH for one customer and 25 KWH for another. Therefore, even if the sensed frequency is same for two consumers, the second consumer would pay more since her history shows that she consumed more in the last week. Additionally, in one or more embodiments of the invention, $R=g(f,h; a_0, a_1, a_2, \ldots, a_m)$, wherein g(.) is a function that determines the rate at which the consumer is charged, and $a_0, a_1, a_2, \ldots, a_m$ are the parameters of the function g(.). These parameters can be obtained from the grid, or these parameters can be hard-wired in the meter. Also, these parameters can include, for example, the coefficients/exponents of the terms of the pricing equation specified by the utility. Additionally, as detailed herein, the total energy price P=R*total current consumption.

Figure 2:
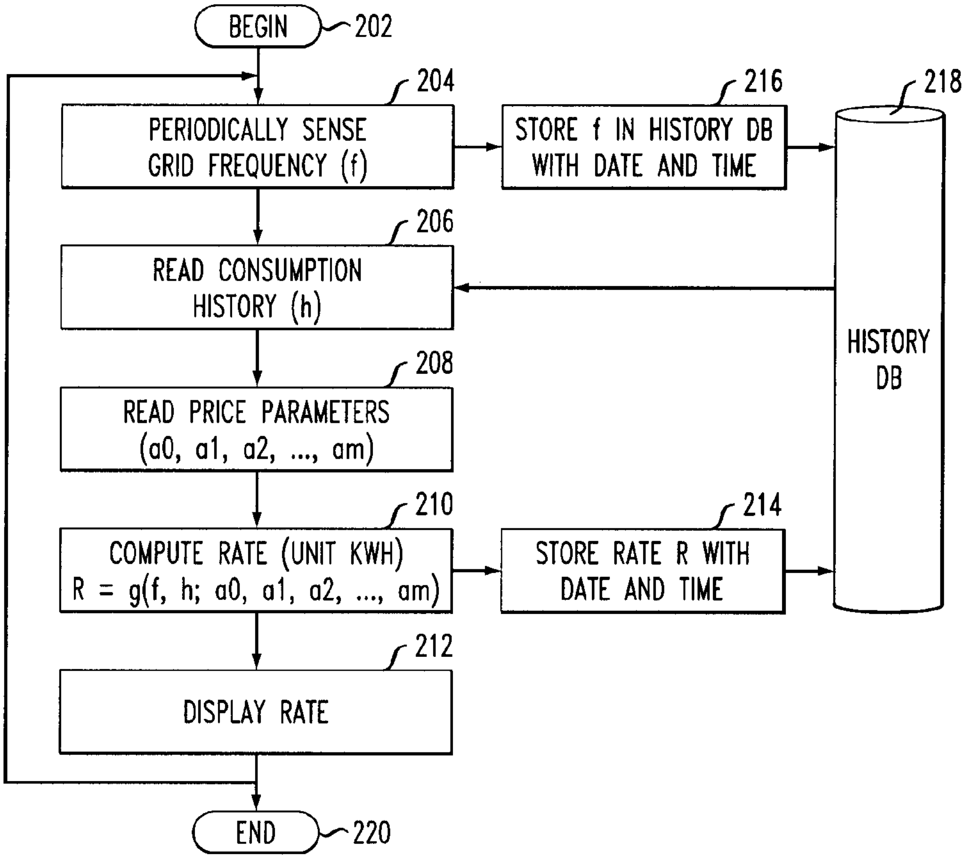
FIG. 2 is a diagram illustrating a flow diagram for computing a unit energy rate, according to an embodiment of the present invention.

FIG. 2 is a diagram illustrating a flow diagram for computing a unit energy rate, according to an embodiment of the present invention. Step 202 includes beginning the process. Step 204 includes periodically sensing grid frequency (f). Step 216 includes storing grid frequency (f) in a history database 218 with the date and time. Step 206 includes retrieving consumption history (h) from the local database. Step 208 includes reading price parameters (for example, $a_0, a_1, a_2, \ldots, a_m$). Step 210 includes computing a rate (unit KWH) such that $R=g(f,h; a_0, a_1, a_2, \ldots, a_m)$. Step 214 includes storing the rate (R) in a history database 218 with the date and time. Also, step 212 includes displaying the computed rate, and step 220 includes ending the process.

Figure 3:
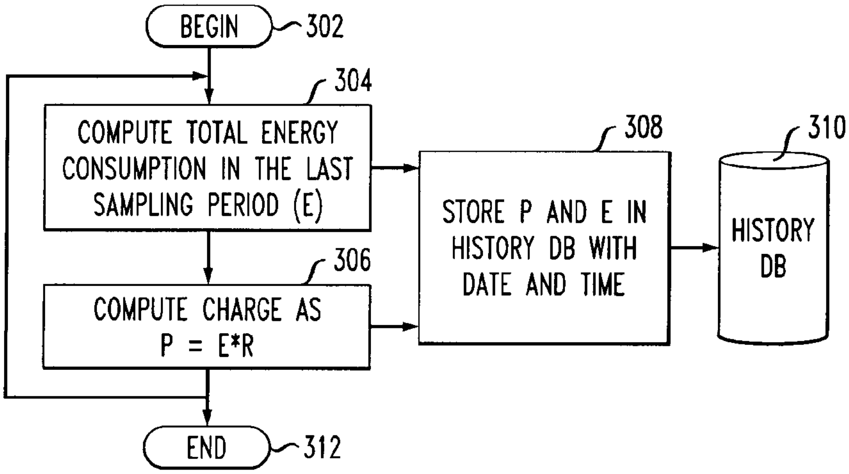
FIG. 3 is a diagram illustrating a flow diagram for computing total charges, according to an embodiment of the present invention.

FIG. 3 is a diagram illustrating a flow diagram for computing total charges, according to an embodiment of the present invention. Step 302 includes beginning the process. Step 304 includes computing total energy consumption in the last sampling period (E). Step 306 includes computing a charge as P=E*R. Step 308 includes storing the total energy consumption (E) and the charge (P) in a history database 310 with the date and time. Also, step 312 includes ending the process.

In one or more embodiments of the invention, the FSM stores (for some reasonable and/or user-determined amount of time) the computed values locally. If the history database is full and a new value needs to be inserted, the oldest record can be deleted to make space. By way of example, in one or more embodiments of the invention, only the total monthly charges are uploaded to the utility server. This reduces communication costs while still preserving the necessary information. However, the locally stored historical consumption and charges can be sent to the utility server, if requested. The FSMs can periodically recalibrate their frequency sensing circuit by comparing the frequency measured by the sensing circuit with the frequency measured by the utility server. Also, for example, the clocks of meters can be synchronized with those of the utility server through network time protocol (NTP).

The price parameters of the meter depend on the type of consumer (for example, a hospital versus a laundry shop). These parameters also depend on the price sensitivity, wherein users become sensitive after a certain threshold (gradient of the price sensitivity curve). In one or more embodiments of the invention, a learning algorithm can be used to learn the nature of the curve R versus (f, h), depending on the available data. The parameters can be guided by the estimated decrease in the peak load under certain assumptions.

As such, as detailed herein, one or more embodiments of the invention include an intelligent metering service with fully distributed control (a utility company, for example, need not publish the daily pricing schedule). Additionally, one or more embodiments of the invention can completely depend on the local characteristic (f, h) and realize the peak reduction in a self-organized manner.

Figure 4:
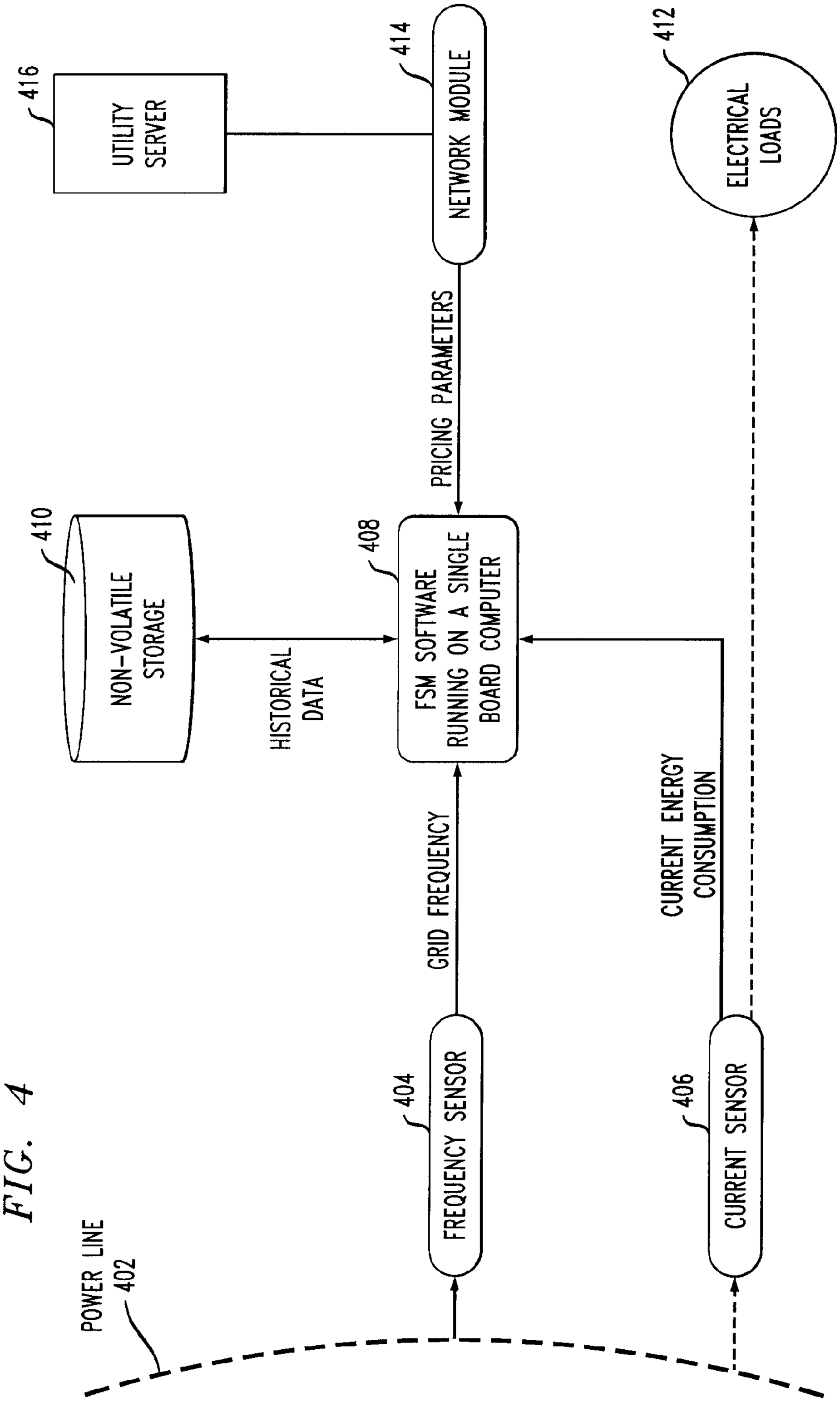
FIG. 4 is a block diagram illustrating an exemplary embodiment, according to an aspect of the invention.

FIG. 4 is a block diagram illustrating an exemplary embodiment, according to an aspect of the invention. By way of illustration, FIG. 4 depicts a power line 402 whose signal frequency is measured by a frequency sensor component 404 and a current sensor component 406 that measures the current drawn by the loads 412 from the power line 402. The frequency sensor component 404 and the current sensor component 406 provide input to frequency sensing meter (FSM) software running on a single board computer 408, which also interacts with a non-volatile storage component 410. As also depicted in FIG. 4, FSM software running on a single board computer 408 downloads pricing parameters from a utility server 416 through a network module 414. Additionally, the power line 402 provides electrical energy to various electrical loads 412 such as, for example, lights, fans, refrigerator and any equipment that is powered by electrical energy.

Figure 5:
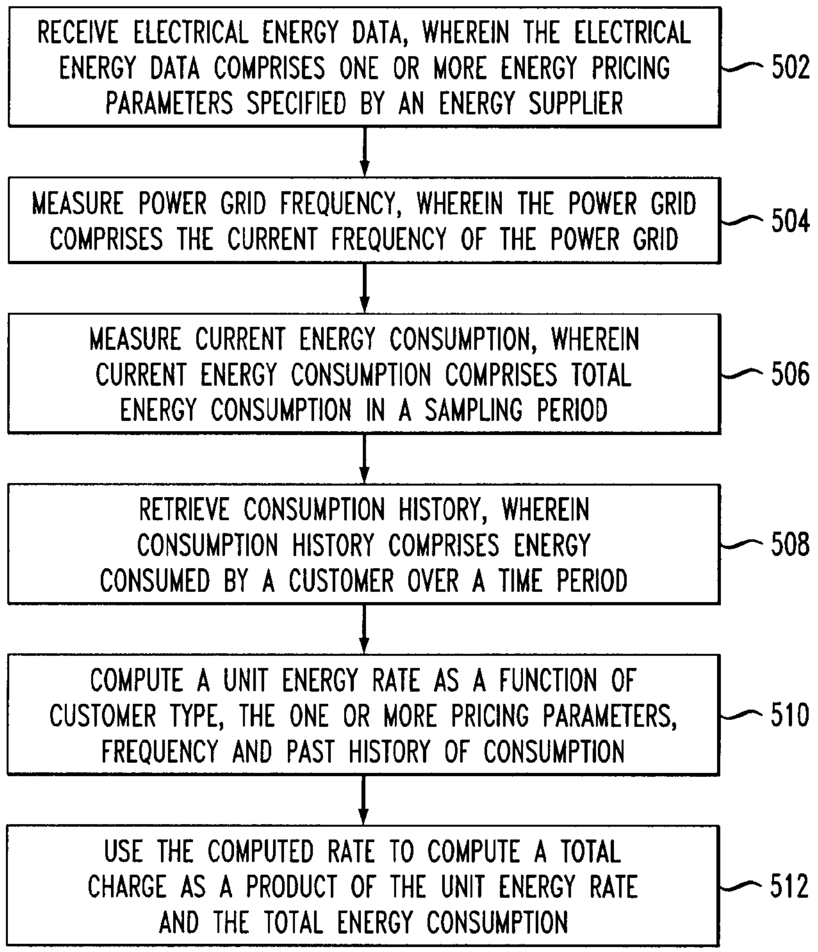
FIG. 5 is a flow diagram illustrating techniques for real-time pricing of electrical energy, according to an embodiment of the invention.

FIG. 5 is a flow diagram illustrating techniques for real-time pricing of electrical energy, according to an embodiment of the present invention. Step 502 includes receiving electrical energy data, wherein the electrical energy data comprises one or more energy pricing parameters specified by an energy supplier. The parameters can include, for example, coefficients/exponents of one or more terms of a pricing equation specified by a utility server. The parameters can be obtained, for example, from a power grid and/or hard-wired in a meter, and the pricing parameters determine the terms of the equations used to compute energy rates.

Step 504 includes measuring power grid frequency, wherein the power grid comprises the current frequency of the power grid. Measuring the frequency can include measuring electrical grid frequency with a frequency sensing meter (FSM). Step 506 includes measuring current energy consumption, wherein current energy consumption comprises total energy consumption in a sampling period. Step 508 includes retrieving consumption history, wherein consumption history comprises energy consumed by a customer over a time period (for example, a sliding window).

Step 510 includes computing a unit energy rate as a function of customer type, the one or more pricing parameters, frequency and past history of consumption. Computing a unit energy rate can include, for example, using the frequency sensing meter (FSM) to map the power grid frequency to a price on a frequency versus kilowatt hour (KWH)-rate curve sent by a utility server. Step 512 includes using the computed rate to compute a total charge as a product of the unit energy rate and the total energy consumption.

One or more embodiments of the invention can also include computing a unit energy rate as a function of frequency and past history of consumption using the FSM to map the power grid frequency to a price on a frequency versus kilowatt hour (KWH)-rate curve sent by a utility server. Further, the techniques depicted in FIG. 5 can additionally include recalibrating a frequency sensing circuit of the FSM by comparing the frequency measured by the sensing circuit with a frequency measured by a utility server. Also, one or more embodiments of the invention include recalibrating a rate computation module of the frequency sensing meter (FSM) by considering at least one of past data, type of customer and price sensitivity of a customer. Additionally, one or more embodiments of the invention include the FSM storing the electrical energy data locally (for example, for some reasonable and/or user-determined amount of time).

The techniques depicted in FIG. 5 can also, as described herein, include providing a system, wherein the system includes distinct hardware and software modules, each of the distinct software modules being embodied on a tangible computer-readable recordable storage medium. The distinct software modules can include, for example, a frequency sensor module, a current sensor module, a frequency sensing meter module, a non-volatile storage module and a network module (as well as, for example, a utility server) executing on a hardware processor.

Additionally, portions of the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
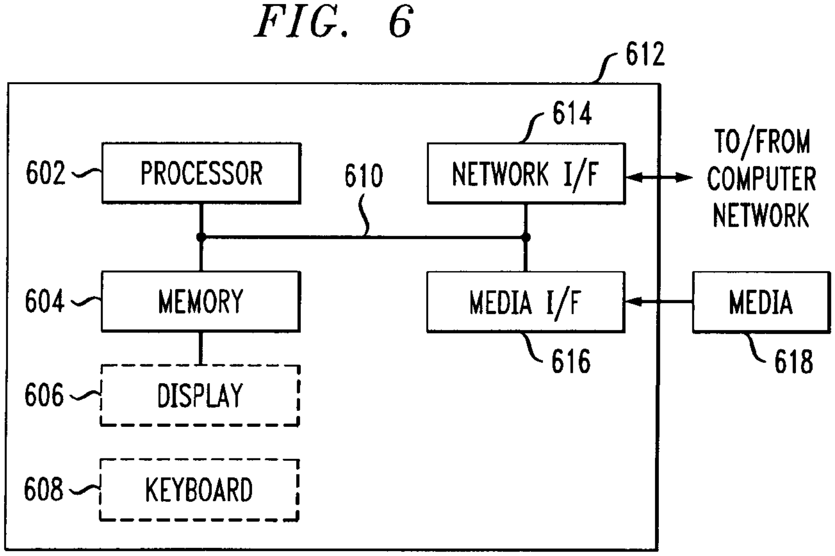
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing an intelligent metering service with fully distributed control.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for real-time pricing of electrical energy, wherein the method comprises:

receiving electrical energy data, wherein the electrical energy data comprises one or more energy pricing parameters specified by an energy supplier, wherein the one or more energy pricing parameters depend on type of customer and on price sensitivity of a customer, and wherein receiving electrical energy data is carried out via a module executing on a hardware processor;

measuring power grid frequency for a sampling period of a pre-determined duration, wherein the power grid comprises the current frequency of the power grid, and wherein measuring power grid frequency is carried out via a module executing on a hardware processor;

measuring current energy consumption, wherein current energy consumption comprises total energy consumption in a most recent sampling period, and wherein measuring current energy consumption is carried out via a module executing on a hardware processor;

storing the total energy consumption for the most recent sampling period in a database;

retrieving consumption history from the database, wherein consumption history comprises cumulative energy consumption by a customer over a sliding window time period of multiple sampling periods, and wherein retrieving consumption history is carried out via a module executing on a hardware processor;

computing a unit energy rate as a function of customer type, the one or more pricing parameters, the measured power grid frequency and the retrieved consumption history, wherein computing a unit energy rate is carried out via a module executing on a hardware processor; and using the computed rate to compute a total charge for the most recent sampling period as a product of the unit energy rate and the total energy consumption in the most recent sampling period, wherein using the computed rate to compute a total charge is carried out via a module executing on a hardware processor.

2. The method of claim 1, wherein the one or more parameters comprise one or more coefficients of one or more terms of a pricing equation specified by a utility server.

3. The method of claim 1, wherein the one or more parameters are at least one of obtained from the power grid and hard-wired in a meter.

4. The method of claim 1, wherein measuring the frequency comprises measuring electrical grid frequency with a frequency sensing meter (FSM).

5. The method of claim 4, wherein computing a unit energy rate as a function of customer type, the one or more pricing parameters, frequency and past history of consumption comprises using the frequency sensing meter (FSM) to map the power grid frequency to a price on a frequency versus kilowatt hour (KWH)-rate curve sent by a utility server.

6. The method of claim 4, further comprising recalibrating a frequency sensing circuit of the frequency sensing meter (FSM) by comparing the frequency measured by the sensing circuit with a frequency measured by a utility server.

7. The method of claim 6, further comprising recalibrating a rate computation module of the frequency sensing meter (FSM) by considering at least one of past data, type of customer and price sensitivity of a customer.

8. The method of claim 1, further comprising a frequency sensing meter (FSM) storing the electrical energy data locally.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a frequency sensor module, a current sensor module, a frequency sensing meter module, a non-volatile storage module and a network module executing on a hardware processor.

10. A computer program product comprising a non-transitory tangible computer readable recordable storage medium including computer useable program code for real-time pricing of electrical energy, the computer program product including:

- computer useable program code for receiving electrical energy data, wherein the electrical energy data comprises one or more energy pricing parameters specified by an energy supplier, and wherein the one or more energy pricing parameters depend on type of customer and on price sensitivity of a customer;
- computer useable program code for measuring power grid frequency for a sampling period of a pre-determined duration, wherein the power grid comprises the current frequency of the power grid;
- computer useable program code for measuring current energy consumption, wherein current energy consumption comprises total energy consumption in a most recent sampling period;
- computer useable program code for storing the total energy consumption for the most recent sampling period in a database;
- computer useable program code for retrieving consumption history from the database, wherein consumption history comprises cumulative energy consumption by a customer over a sliding window time period of multiple sampling periods;
- computer useable program code for computing a unit energy rate as a function of customer type, the one or more pricing parameters, the measured power grid frequency and the retrieved consumption history; and
- computer useable program code for using the computed rate to compute a total charge for the most recent sampling period as a product of the unit energy rate and the total energy consumption in the most recent sampling period.

11. The computer program product of claim 10, wherein the one or more parameters comprise one or more coefficients of one or more terms of a pricing equation specified by a utility server.

12. The computer program product of claim 10, wherein the computer useable program code for measuring the frequency comprises computer useable program code for measuring electrical grid frequency with a frequency sensing meter (FSM).

13. The computer program product of claim 12, wherein the computer useable program code for computing a unit energy rate as a function of customer type, the one or more pricing parameters, frequency and past history of consumption comprises computer useable program code for using the frequency sensing meter (FSM) to map the power grid frequency to a price on a frequency versus kilowatt hour (KWH)-rate curve sent by a utility server.

14. The computer program product of claim 10, wherein the computer useable program code comprises one or more distinct software modules, and wherein the one or more distinct software modules comprise a frequency sensor module, a current sensor module, a frequency sensing meter module, a non-volatile storage module and a network module executing on a hardware processor.

15. A system for real-time pricing of electrical energy, comprising:

- a memory; and
- at least one processor coupled to the memory and operative to:
  - receive electrical energy data, wherein the electrical energy data comprises one or more energy pricing parameters specified by an energy supplier, and wherein the one or more energy pricing parameters depend on type of customer and on price sensitivity of a customer;
  - measure power grid frequency for a sampling period of a pre-determined duration, wherein the power grid comprises the current frequency of the power grid;
  - measure current energy consumption, wherein current energy consumption comprises total energy consumption in a most recent sampling period;
  - store the total energy consumption for the most recent sampling period in a local database;
  - retrieve consumption history from the local database, wherein consumption history comprises cumulative energy consumption by a customer over a sliding window time period of multiple sampling periods;
  - compute a unit energy rate as a function of customer type, the one or more pricing parameters, the measured power grid frequency and the retrieved consumption history; and
  - use the computed rate to compute a total charge for the most recent sampling period as a product of the unit energy rate and the total energy consumption in the most recent sampling period.

16. The system of claim 15, wherein the one or more parameters comprise one or more coefficients of one or more terms of a pricing equation specified by a utility server.

17. The system of claim 15, wherein the at least one processor coupled to the memory is further operative to store the electrical energy data locally.

18. The system of claim 15, wherein the at least one processor coupled to the memory operative to measure the frequency is further operative to measure electrical grid frequency with a frequency sensing meter (FSM).

19. The system of claim 18, wherein the at least one processor coupled to the memory operative to compute a unit energy rate as a function of customer type, the one or more pricing parameters, frequency and past history of consumption is further operative to use the frequency sensing meter (FSM) to map the power grid frequency to a price on a frequency versus kilowatt hour (KWH)-rate curve sent by a utility server.

20. The system of claim 15, further comprising a tangible computer-readable recordable storage medium having one or more distinct software modules embodied thereon, wherein the one or more distinct software modules comprise a frequency sensor module, a current sensor module, a frequency sensing meter module, a non-volatile storage module and a network module executing on a hardware processor.

* * * * *